Figure 1:
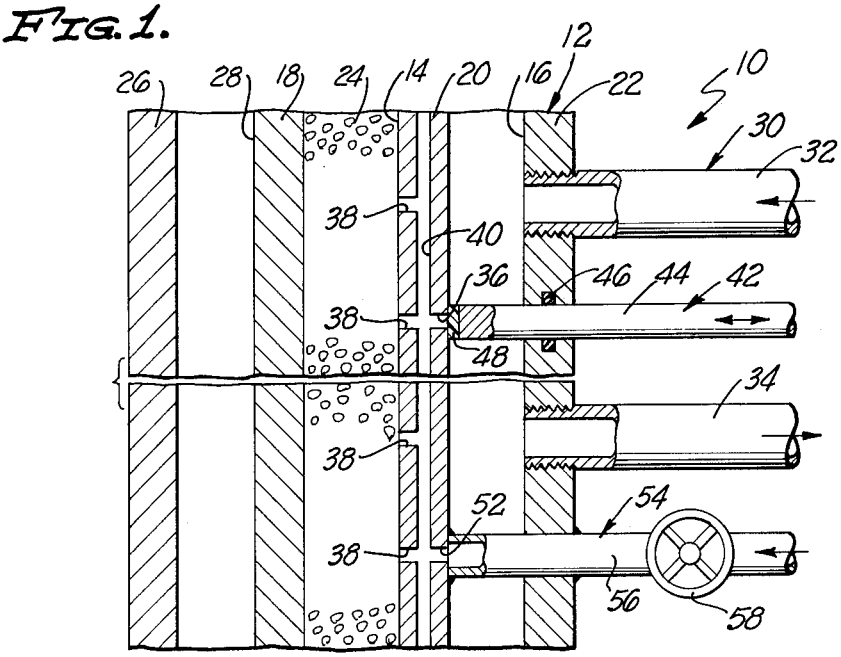

Feb. 22, 1966 S. W. THOMPSON 3,235,908

MOLDING APPARATUS

Filed June 24, 1965

INVENTOR.
STANLEY W. THOMPSON
BY HIS ATTORNEYS
HARRIS, KIECH, RUSSELL & KERN

United States Patent Office 3,235,908
Patented Feb. 22, 1966

3,235,908
MOLDING APPARATUS
Stanley W. Thompson, Scottsdale, Ariz., assignor to Rexall Drug and Chemical Company, Los Angeles, Calif., a corporation of Delaware
Filed June 24, 1965, Ser. No. 466,601
6 Claims. (Cl. 18—5)

The present invention relates in general to a molding apparatus and, more particularly, to an apparatus intended especially for molding foamable plastic materials.

Materials of this nature are ordinatrily thermoplastic and are normally provided in the form of granules or pellets containing a foaming agent responsive to heat. The foaming agent may merely comprise gaseous inclusions in the pellets or granules, although other agents may be utilized also. When such a foamable plastic material is confined in a mold cavity and the mold is heated, the granules or pellets expand, due to the action of the foaming agent incorporated therein, and fuse together into an integral mass conforming to the mold cavity. The necessary heat is normally applied to one or more of the walls of the mold cavity, which tends to fuse the foamable plastic material into an impervious, glazed surface wherever it contacts a heated wall of the mold cavity. The interior of the molded article, however, has a cellular structure providing excellent heat insulating qualities, cushioning qualities, buoyancy, and the like. For example, articles molded of foamable plastic materials in this manner provide excellent heat insulating drinking cups.

It will be understood that the foregoing molding procedure may be applied to any desired article and that the invention is not to be regarded as limited to any particular article. Examples of articles which may be molded of foamable plastic materials in this fashion include, in addition to drinking cups, such things as picnic boxes, portable refrigerating chests, flotation devices, cushioning materials for use in packaging, and the like. For this reason, the invention will be considered herein in connection with a general mold configuration only, and will not be limited to any particular mold configuration. For an example of a complete molding machine with which the present invention might be utilized, attention is directed to Patent No. 2,951,260, granted September 6, 1960, to James M. Harrison and Robert F. Smucker, the disclosure of such patent being incorporated herein by reference.

As disclosed in the aforementioned patent, the wall or walls of the mold cavity may be heated by the external application of steam thereto in order to heat the foamable plastic material within the mold cavity sufficiently to provide the resulting article with a fused cellular interior and a glazed surface wherever it contacts a wall of the mold cavity. Heating in this fashion is excessively slow and, to increase production rates, it is desirable to heat the foamable plastic material within the mold cavity further by the direct application of steam thereto. However, if this is done prior to thoroughly preheating the mold and the foamable plastic material, considerable quantities of steam may condense within the mold cavity. The presence of excessive amounts of water has an adverse effect on the molding operation. For example, the water tends to prevent fusion between the pellets or granules, and may result in voids which permit leakage. Also, excessive water in the mold cavity may result in pockmarked surfaces. Another disadvantage is that water present in liquid form inhibits uniform heat transfer throughout the mass of foamable plastic material in the mold cavity. Still another drawback is that the surface tension of water in liquid form adhering to the plastic pellets or granules may inhibit uniform distribution of the pellets or granules throughout the mold cavity.

For the foregoing and other reasons, it is essential that the mold be thoroughly preheated prior to the introduction of any steam into the mold cavity into direct contact with the foamable plastic material therein. If thorough preheating occurs prior to the introduction of steam, then condensation within the mold cavity is held to an insignificant minimum.

With the foregoing as background, general objects of the invention are: to provide a very simple apparatus for introducing steam into the mold cavity only after the mold has been thoroughly preheated; to provide a molding apparatus which permits preheating the mold and filling the mold cavity with the granular foamable material simultaneously, thereby reducing significantly the total time required for the molding operation; to provide an apparatus for introducing steam into the mold cavity which is of simple construction and which requires the addition of only a minimum of structure to an ordinary steam heated mold; and to provide a mold which includes valve means for admitting steam from a steam chamber adjacent the mold cavity into the mold cavity only after the mold has been thoroughly preheated and the mold has been filled with the foamable plastic pellets or granules. With this construction, the mold cavity is isolated from the steam chamber initially, the desired introduction of steam into the mold cavity at the proper time being achieved very simply by opening the valve means mentioned to establish communication between the steam chamber and the mold cavity. Thus, no steam is introduced into the mold cavity prior to preheating, and no elaborate system of multiple chambers around the mold cavity is needed, which are important features.

Considering the present invention more specifically now, a primary object thereof is to provide a molding apparatus which includes: wall means defining a mold cavity and a steam chamber and including an intermediate wall separating the mold cavity from the steam chamber; steam introducing means for introducing steam into the steam chamber; the intermediate wall being provided therein with a steam inlet port which communicates with the steam chamber; the intermediate wall being provided therein with spaced, manifolded outlet ports which communicate with the mold cavity and with the steam inlet port; and valve means projecting into the steam chamber for opening and closing the steam inlet port.

With the foregoing construction, when the steam inlet port is opened by the valve means, steam from the steam chamber is introduced into the preheated mold cavity at a plurality of points simultaneously to obtain more uniform steam distribution throughout and more uniform heating of the foamable plastic material in the mold cavity, which is an important feature.

Another and important object of the invention is to surround or jacket the valve means with the means for introducing steam into the steam chamber, thereby heating the valve means and providing a long heated passage for the steam entering the steam inlet port upon opening of the valve means. This construction is important in the particular art to which the invention relates in that it minimizes the formation of water droplets in the steam admitted into the mold caivty. Additionally, any water droplets which do form are broken up and/or evaporated by the heated walls with which the steam comes in contact prior to entering the steam inlet port in the intermediate wall separating the steam chamber and the mold cavity. The end result is that the introduction of water into the mold cavity in liquid form is minimized to minimize the hereinbefore-discussed detrimental effects thereof on the molding operation and the molded product.

Another important object of the invention is to provide the intermediate wall separating the steam chamber from the mold cavity with an air inlet port which communicates with the spaced, manifolded outlet ports in such intermediate wall, and to provide means for supplying air under pressure to such air inlet port when it is desired to eject the molded product from the mold cavity. With this construction, the outlet ports communicating with the mold cavity are utilized for both steam injection and the introduction of ejection air, which is an important feature. Furthermore, the introduction of ejection air at a plurality of spaced points more effectively ejects the molded article from the mold cavity, which is another important feature.

Figure 2:
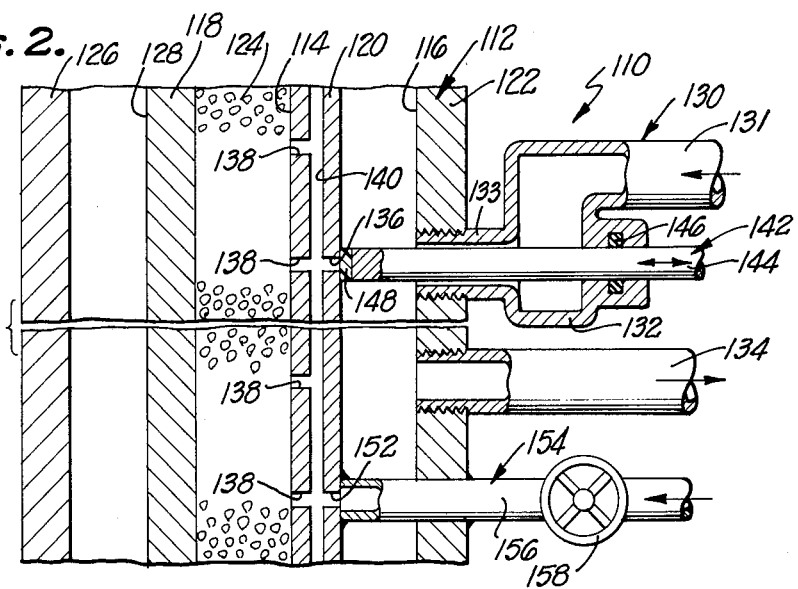

The foregoing objects, advantages, features and results of the present invention, together with various other objects, advantages, features and results thereof which will be evident to those skilled in the molding art in the light of this disclosure, may be achieved with the exemplary embodiments of the invention described in detail hereinafter and illustrated in the accompanying drawing, in which:

FIG. 1 is a fragmentary sectional view showing part of a molding apparatus which embodies the invention; and FIG. 2 is a view similar to FIG. 1 and illustrates the presently preferred embodiment of the invention.

Referring initially to FIG. 1 of the drawing, illustrated therein is a molding apparatus 10 which includes wall means 12 defining a mold cavity 14 and a steam chamber 16. More particularly, the wall means is shown as including walls 18, 20 and 22, the intermediate wall 20 separating the mold cavity 14 from the steam chamber 16.

The mold cavity 14 is adapted to receive pellets or granules of a foamable plastic material 24 which may be introduced thereinto in any suitable manner. It will be understood that the mold cavity 14 is shown semi-diagrammatically solely for purposes of illustration and that it may have any desired over-all configuration, depending upon the article or product to be molded. For example, the fragment of the mold cavity 14 which is shown in FIG. 1 of the drawing may represent one wall of a drinking cup, or other container.

In the construction illustrated in FIG. 1 of the drawing, the wall means 12 includes a fourth wall 26 which cooperates with the wall 18 to form another steam chamber 28 on the opposite side of the mold cavity 14 from the steam chamber 16. Thus, the wall 18 is also an intermediate wall separating the mold cavity 14 from the steam chamber 28. If desired, the intermediate wall 18 and the steam chamber 28 may have the hereinafter-described structure of the intermediate wall 20 and the steam chamber 16. Alternatively, the steam chambers 16 and 28 may be suitably interconnected so as to constitute, in effect, a single chamber.

The molding apparatus 10 includes means 30 for introducing steam into the steam chamber 16, the steam introducing means being shown as a simple pipe 32 threaded into the wall 22 and communicating with the steam chamber 16. This steam chamber is also provided with an outlet 34 shown as a simple pipe threaded into the wall 22.

The intermediate wall 20 is provided therein with a steam inlet port 36 which communicates with the steam chamber 16. Also formed in the intermediate wall 20 are spaced outlet ports 38 which communicate with the mold cavity 14. The steam inlet port 36 and the outlet ports 38 are all manifolded together by a manifolding passage 40 in the intermediate wall 20. With this construction, when the steam inlet port 36 is opened in a manner to be described, steam from the steam chamber 16 is introduced into the mold caivty 14 at a plurality of spaced points to achieve uniform steam distribution throughout the mold cavity after the molding apparatus 10 has been preheated thoroughly.

The steam inlet port 36 is adapted to be opened and closed by a valve means 42 shown as including a reciprocable valve member 44 projecting through the wall 22 and into the steam chamber 16 in alignment with the steam inlet port 36. The valve member 44 may be actuated in any suitable manner and is sealed relative to the wall 22 by a suitable sealing element 46. The valve member 44 is provided at its inner end with an elastomeric valve element 48 which is engageable with the intermediate wall 20 around the steam inlet port 36 to close such port. It will be understood that the valve element 48 is made of an elastomeric material capable of withstanding high temperatures.

The intermediate wall 20 is also provided therein with an air inlet port 52 which communicates with the manifolding passage 40. The molding apparatus 10 includes means 54 for supplying air under pressure to the air inlet port 52 when it is desired to eject the molded article from the mold cavity 14, the ejection air being introduced into the mold cavity at a plurality of points through the manifolding passage 40 and the outlet ports 38. The air supplying means 54 is shown as including a pipe 56 extending through the wall 22 and the steam chamber 16 into communication with the air inlet port 52, the supply of air being controlled by a valve 58 in the pipe.

Considering the operation of the molding apparatus 10, the mold cavity 14 may be filled with the foamable plastic material 24 while the apparatus is being preheated. Thus, it is unnecessary to delay the introduction of the material to be molded until after the molding apparatus has been preheated, which reduces the over-all molding time considerably.

After the molding apparatus 10 and the foamable plastic material 24 in the mold cavity 14 have been preheated sufficiently to preclude significant condensation within the mold cavity upon the introduction of steam thereinto, the valve means 42 is opened to establish communication between the steam chamber 16 and the mold cavity by way of the steam inlet port 36, the manifolding passage 40 and the outlet ports 38. This results in steam injection into the mold cavity 14, and the foamable plastic material 24 therein, at a plurality of spaced points to achieve uniform and rapid heating of the foamable plastic material. The valve means 42 is left open until sufficient steam has been admitted to the mold cavity 14 to achieve the desired further heating of the foamable plastic material 24. Thereupon, the valve means 42 is closed and, when the molding operation has been completed, the introduction of steam into the steam chamber 16 is terminated. In some instances, it may be desirable to close the valve means 42 and to terminate the introduction of steam into the steam chamber 16 (and the steam chamber 28) simultaneously. In other instances, it may be desirable to continue the introduction of steam after interrupting the admission of steam into the mold cavity 14. In either event, because of the preheating prior to admitting steam into the mold cavity 14, condensation within the mold cavity is held to a minimum.

Subsequently, a suitable coolant, such as cold water, may be circulated through the steam chamber 16 (and the steam chamber 28), as by way of the inlet 32 and the outlet 34. After the molding apparatus 10 and the molded article in the cavity 14 have been cooled sufficiently to set the molded article enough to render it self supporting, the mold may be opened for the purpose of removing the molded article. At this time, the ejection air valve 58 is opened to introduce air under pressure into the mold cavity 14, between the molded article and the wall 20, by way of the pipe 56, the air inlet port 52, the manifolding passage 40 and the outlet ports 38. Introducing ejection air at a plurality of points in this fashion insures rapid ejection of the molded article without distortion.

It will be noted that since the valve means 42 is closed during the cooling portion of the cycle, none of the coolant comes into contact with the molded article. This avoids producing any imperfections in the molded article which might result from direct contact of the coolant therewith.

Thus, the present invention provides, in a relatively simple structure, means for accelerating the molding operation materially while still insuring a perfectly molded product.

Turning now to FIG. 2 of the drawings, illustrated therein is a molding apparatus 110 of the invention which is very similar to the apparatus 10. Consequently, the various components of the molding apparatus 110 are identified by numerals higher by one hundred than the numerals used to identify the corresponding components of the apparatus 10.

The difference between the molding apparatus 110 and the apparatus 10 is that the valve means 142 is surrounded or jacketed by the steam introducing means 130. More particularly, the steam introducing means 130 includes a steam inlet pipe 131 terminating in a steam chamber 132 connected to the steam chamber 116 by a short conduit 133. The valve member 144 extends through the steam chamber 132 and the conduit 133 into the steam chamber 116, being sealed by the annular sealing element 146.

With this construction, condensation is further minimized and any water droplets that do form are broken up and/or evaporated on the various heated surfaces surrounding and adjacent the valve means 142. Consequently, the possibility of introducing water in liquid form into the mold cavity 114 is reduced to an insignificant minimum.

Although exemplary embodiments of the invention have been disclosed herein in semidiagrammatic form, it will be understood that various changes, modifications and substitutions may be incorporated in such embodiments without departing from the spirit of the invention as defined by the claims which follow:

1. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port; and
(e) valve means projecting into said steam chamber for opening and closing said steam inlet port.

2. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port; and
(e) valve means surrounded by said steam introducing means and projecting into said steam chamber for opening and closing said steam inlet port.

3. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port;
(e) valve means surrounded by said steam introducing means and projecting into said steam chamber for opening and closing said steam inlet port; and
(f) said valve means including an elastomeric valve element engageable with said intermediate wall around said steam inlet port to close same.

4. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port;
(e) valve means projecting into said steam chamber for opening and closing said steam inlet port;
(f) said intermediate wall being provided therein with an air inlet port which communicates with said outlet ports therein; and
(g) means for supplying air under pressure to said air inlet port.

5. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port;
(e) valve means surrounded by said steam introducing means and projecting into said steam chamber for opening and closing said steam inlet port;
(f) said intermediate wall being provided therein with an air inlet port which communicates with said outlet ports therein; and
(g) means for supplying air under pressure to said air inlet port.

6. In a molding apparatus, the combination of:
(a) wall means defining a mold cavity and a steam chamber and including an intermediate wall separating said mold cavity from said steam chamber;
(b) steam introducing means for introducing steam into said steam chamber;
(c) said intermediate wall being provided therein with a steam inlet port which communicates with said steam chamber;
(d) said intermediate wall being provided therein with spaced, manifolded outlet ports which communicate with said mold cavity and with said steam inlet port;
(e) valve means surrounded by said steam introducing means and projecting into said steam chamber for opening and closing said steam inlet port;
(f) said valve means including an elastomeric valve element engageable with said intermediate wall around said steam inlet port to close same;
(g) said intermediate wall being provided therein with an air inlet port which communicates with said outlet ports therein; and (h) means for supplying air under pressure to said air inlet port.

References Cited by the Examiner
UNITED STATES PATENTS

| | | |
|---|---|---|
| 2,954,589 | 10/1960 | Brown. |
| 3,111,710 | 11/1963 | Plymale _____ 18—5 |
| 3,125,780 | 3/1964 | Harrison et al. _____ 18—5 |
| 3,156,015 | 11/1964 | Harrison _____ 18—5 X |
| 3,167,811 | 2/1965 | Kraus et al. _____ 18—5 |
| 3,193,876 | 7/1965 | Thompson _____ 18—5 |

WILLIAM J. STEPHENSON, *Primary Examiner.*